(12) United States Patent
Tsinker

(10) Patent No.: US 6,489,838 B1
(45) Date of Patent: *Dec. 3, 2002

(54) APPARATUS AND METHOD FOR EQUALIZING RECEIVED NETWORK SIGNALS USING A SINGLE ZERO HIGH-PASS FILTER HAVING SELECTABLE IMPEDANCE

(75) Inventor: Vadim Tsinker, Belmont, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/140,640

(22) Filed: Aug. 26, 1998

Related U.S. Application Data

(60) Provisional application No. 60/082,183, filed on Apr. 17, 1998.

(51) Int. Cl.[7] ................................................. H03K 5/00
(52) U.S. Cl. ....................... 327/557; 327/336; 327/552; 330/304; 330/305; 330/302
(58) Field of Search ................................. 327/336, 552, 327/553, 559, 103, 554, 555, 556, 557, 558; 330/302, 304, 305; 375/232

(56) References Cited

U.S. PATENT DOCUMENTS

| | | | | |
|---|---|---|---|---|
| 5,048,055 A | * | 9/1991 | Creigh et al. ................. | 375/11 |
| 5,384,501 A | * | 1/1995 | Koyam et al. ............... | 327/336 |
| 5,530,391 A | * | 6/1996 | Bohme et al. ............... | 327/552 |
| 5,808,498 A | * | 9/1998 | Donnelly et al. ........... | 327/238 |
| 5,978,417 A | * | 11/1999 | Baker et al. ................. | 375/232 |
| 6,104,236 A | * | 8/2000 | Tsinker ........................ | 327/557 |
| 6,137,832 A | * | 10/2000 | Lin et al. ..................... | 375/232 |

FOREIGN PATENT DOCUMENTS

| | | | | | |
|---|---|---|---|---|---|
| JP | 352039349 A | * | 3/1977 | ................. | 327/308 |
| JP | 363103505 A | * | 5/1988 | ................. | 327/553 |

* cited by examiner

*Primary Examiner*—Dinh T. Le

(57) ABSTRACT

A network line equalizer includes a transconductance-controlled, tunable single zero high-pass, filter that includes a single zero impedance circuit, and first and second MOS transistors that output differential currents based on differential input signals and the impedance of the single zero impedance circuit. The MOS transistors act as source followers to convert the differential input voltage signals to respective differential current signals. The single zero impedance circuit connects the first and second MOS transistors, and causes the first and second MOS transistors to output a corrected pair of differential signals based on the impedance. The impedance of the single zero IMPEDANCE circuit is implemented using CMOS transistors, enabling the impedance to be dynamically controlled by an external impedance controller.

22 Claims, 5 Drawing Sheets

APPARATUS AND METHOD FOR EQUALIZING RECEIVED NETWORK SIGNALS USING A SINGLE ZERO HIGH-PASS FILTER HAVING SELECTABLE IMPEDANCE

CROSS REFERENCE TO RELATED APPLICATIONS

This application claims priority from Provisional Application No. 60/082,183, filed Apr. 17, 1998, entitled "Quad Fast Ethernet Transceiver for 10 BASE-T/100 BASE-X (QFEX 10/100)."

BACKGROUND OF THE INVENTION

1. Technical Field

The present invention relates to network line equalizers having high-pass filters for equalizing attenuated transmitted analog signals, such as multiple layer transition (MLT-3) decoded signals, from a network medium such as a 100-BASE-TX Ethernet (IEEE standard 802.3u) transmission medium.

2. Background Art

Local area networks use a network cable or other network media to link nodes (e.g., workstations, routers and switches) to the network. Each local area network architecture uses a media access control (MAC) enabling a network interface device at each network node to share access to the media.

Physical (PHY) layer devices are configured for translating digital packet data received from a MAC across a standardized interface, e.g., a media independent interface (Mll), into an analog signal for transmission on the network medium, and reception of analog signals transmitted from a remote node via the network medium. An example is the 100 BASE-TX IEEE standard 802.3u receiver, configured for receiving a 3-level MLT-3 encoded analog signal at a 125 Mb/s data rate.

One problem with transmission of analog signals on the network medium is the attenuation of high-frequency components. For example, FIG. 1A is a diagram illustrating the frequency response characteristics f(line) of the network medium. As shown in FIG. 1A, an MLT-3 encoded signal transmitted by the network medium encounters transmission loss in the form of high-frequency attenuation. Hence, the 100-BASE-TX Ethernet (IEEE 802.3u) receiver includes a line equalizer having a high-pass filter, having the frequency response (f (filter)) of FIG. 1B to compensate for the high-frequency attenuation from the network medium. One example of a high-pass filter is a single zero filter.

FIG. 2 is a diagram illustrating a conventional single zero high-pass filter 10. As shown in FIG. 2, the high-pass filter 10 includes an operational amplifier 12, a capacitor 14 having capacitance C, and a resister 16 having resistance R. As recognized in the art, the high-pass filter 10 has a transfer function H(s)=S+Z, where Z equals 1/RC. Hence, the high-pass circuit 10 is considered a single zero filter, where S is a complex variable based on frequency.

A disadvantage of the high pass filter 10 is that a high bandwidth operational amplifier 12 is required for implementation. In addition, a direct connection of the high-pass filter 10 within a line equalizer may affect the impedance of the transmission line (i.e., the network medium), since the capacitor 14 and resistor 16 are in parallel with the transmission line's termination resistance. In addition, the connection of the capacitor 14 is between the two nodes ($V_{IN}$ and $V_O$), neither of which is a ground or a supply node. Hence, the high-pass filter 10 is extremely difficult to implement using CMOS technology, since a CMOS capacitor cannot be connected between two arbitrary nodes.

SUMMARY OF THE INVENTION

There is a need for an arrangement that enables a single zero high-pass to be implemented using CMOS technology with minimal effort.

There is also a need for an arrangement for providing a single zero high-pass filter using MOS transistors that provides a single zero filtering with minimal complexity.

There is also a need for an arrangement in a network line equalizer, where a high-pass filter includes a single zero impedance circuit that has an impedance that can be selectable by a control signal.

These and other needs are attained by the present invention, where first and second metal oxide semiconductor (MOS) transistors, each having a gate for receiving a corresponding differential input signal, are connected to a single zero impedance circuit for generation of differential currents and/or voltages based on the impedance and the differential input signals.

According to one aspect of the present invention, a single zero high-pass filter includes first and second metal oxide semiconductor (MOS) transistors, each having a gate for receiving a corresponding differential input signal, and first and second junctions, and a single zero impedance circuit connecting the first and second MOS transistors at the corresponding first junctions, wherein the second junctions of the first and second MOS transistors output respective differential currents having a difference corresponding to the impedance and the differential input signals. Use of the MOS transistors for receiving the differential input signals provide an infinite DC impedance to the input terminals, significantly reducing signal attenuation at the inputs receiving the differential input signals. Moreover, the MOS transistors provide a high speed operation due to the direct and simple conversion of input voltage between the differential input signals into operating current, where the first and second MOS transistor act as source followers. The use of the MOS transistor also results in an extremely simple high-pass filter that requires little area on a semiconductor circuit. The single zero impedance circuit also enables MOS gate capacitance to be used as at least part of the capacitance element of the impedance, advantageous for CMOS processes where the capacitance element with arbitrary node connection is not available, as opposed to node-to-ground or node to-$V_{cc}$ only.

Another aspect of the present invention includes a network line equalizer configured for receiving a differential pair of transmitted signals from a network medium and outputting a corrected differential pair of transmitted signals. The network line equalizer includes a high-pass filter including (1) first and second MOS transistors, each having a gate for receiving the corresponding differential transmitted signal, and (2) a single zero impedance circuit having an impedance selectable by a control signal. The single zero impedance circuit connects the first and second MOS transistors, and causes the first and second MOS transistors to output the corrected differential pair of transmitted signals based on the impedance. The network line equalizer also includes a control outputting the control signal for selecting the impedance. The selectable impedance in the single zero impedance circuit enables the equalizer to be easily tuned to compensate for different frequency response characteristics, enabling the line to compensate for attention due to different length network media. The use of MOS transistors increases the bandwidth of the line equalizer, enabling CMOS technology to be used. Moreover, the connection of the single zero impedance circuit to the MOS transistor eliminates the necessity of a feedback loop, enabling the line equalizer to perform line equalization for high-frequency signals, without introducing any stability problems.

Still another aspect of the present invention provides a method of equalizing a differential pair of input signals received from a network medium. The method comprises supplying the differential pair of input signals to gates of first and second MOS transistors, respectively, the first and second MOS transistors each having a first junction and a second junction, selecting an impedance of a single zero impedance circuit having first and second terminal ends connected to the first junctions of the first and second MOS transistors, respectively, and outputting a differential pair of equalized signals, generated based on the differential pair of input signals and the selected impedance, from the second junction of the first and second MOS transistors, respectively. Use of a single zero impedance circuit having an impedance selectable by a control signal enables a controller to select the impedance, for example based on changes in the line characteristics of the network media supplying the transmitted signals to the network line equalizer. Moreover, use of first and second MOS transistors for receiving the differential transmitted signal increases the input bandwidth of the high-pass filter, and increases the input resistance of the line equalizer to minimize distortion in the signal received by the network line equalizer.

Additional objects, advantages and novel features of the invention will be set forth in part in the description which follows, and in part may become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1A:
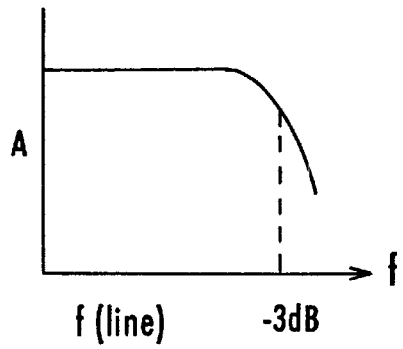
FIGS. 1A and 1B are diagrams illustrating frequency response characteristics of a network medium and a line equalizer, respectively.
Figure 1B:
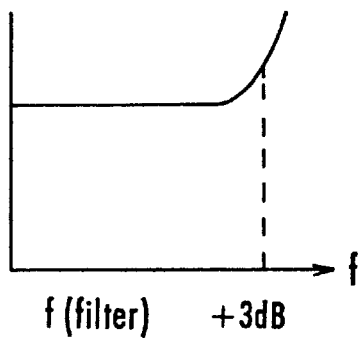
Figure 2:
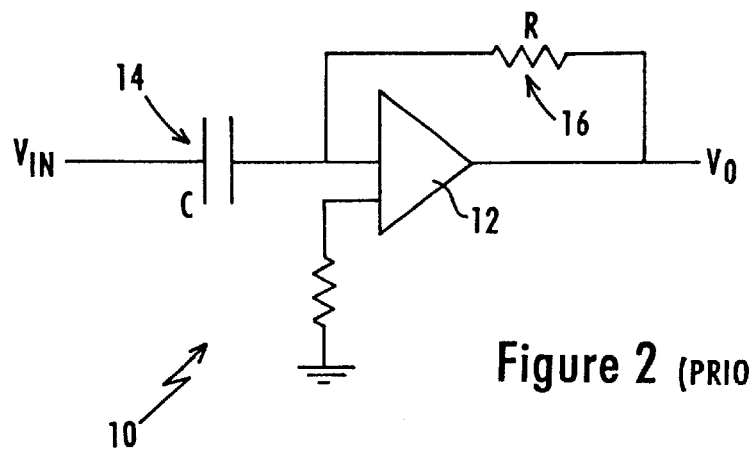
FIG. 2 is a diagram illustrating a prior art single zero high-pass filter.
Figure 3:
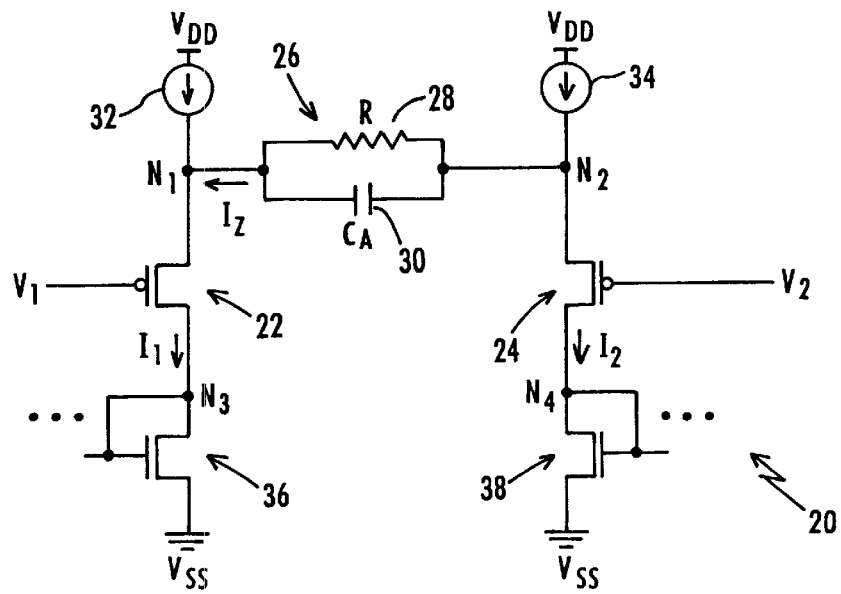
FIG. 3 is a diagram illustrating a single zero high-pass filter according to an embodiment of the present invention.

FIG. 3 is a simplified circuit diagram illustrating a single zero high pass filter according to an embodiment of the present invention. The single zero high-pass filter 20 is a transconductance (GmC)-type filter. According to the disclosed embodiment, a high-pass filter 20 includes metal oxide semiconductor (MOS) transistors 22 and 24 that act as source followers to convert differential input signals $V_1$ and $V_2$ into respective currents $I_1$ and $I_2$. The single zero high-pass filter 20 also includes a single zero impedance circuit 26, having a resistor 28 (R) connected in parallel with a capacitor 30 ($C_A$). The single zero impedance circuit 26 connects the first and second MOS transistors 22 and 24 at the corresponding first junctions $N_1$, and $N_2$. As described below, the single zero impedance circuit 26 outputs a current $I_z$ that corresponds to the difference between the differential input signals $V_2-V_1$ and the impedance (Z) of the single zero impedance circuit 26. Ideally, the input differential voltage $(V_1-V_2,)$ is identical to the voltage between nodes $N_1$, and $N_2$. Hence, the voltage drop across the gates of MOS transistors 22 and 24 are substantially equal, such that $V_1-V_2$ equals $N_1-N_2$.

Hence, the current $I_z$ flowing through the single zero impedance circuit 26 is $I_z=(V_1-V_2)\ C_A\ (S+1/RCA)$. The single zero high-pass filter 20 also includes a first current source 32 and a second current source 34 for supplying a bias current $(V_B)$ to nodes $N_1$ and $N_2$. Hence the total current $(I_1)$ output from the MOS transistor 22 equals $I_1=I_B+I_z$, and the current $(I_2)$ output from the MOS transistor 24 equals $I_2=I_B-I_z$. Hence the second junctions of the first and second MOS transistors, (i.e., nodes $N_3$ and $N_4$) output respective differential currents $I_1$ and $I_2$ having a difference such that $I_1-I_2=I_z$.

Hence, the differential current between nodes $N_3$ and $N_4$ is $2*I_z$, where $I_z$ equals $(V_1-V_2)/Z$, and where Z is the impedance formed by the parallel combination of resistor 28 and capacitor 30 in parallel. The value of Z is $Z=1/C_A*(1/(S+1/RCA))$. Therefore $1/Z=C_A*(S+1/RC_A)$. According to the disclosed embodiment, the single zero has a frequency of about 18 MHz enabling recovery of high frequency components of 125 MHz from the network.

The particular advantage of this single zero high-pass filter 20 is that the MOS transistors 22 and 24 can be connected to current mirror transistors 36 and 38, configured for repeating the differential current from the MOS transistors 22 and 24, respectively.

While the above-described definition (1/Z) is ideal, the actual circuit 20 will add a high frequency pole to the above 1/Z equation. This pole is due to the presence of MOS devices 22 and 24. Increasing the size of the MOS transistors 22 and 24 will move the pole to a sufficiently high frequency such that the lower frequency zero is not significantly affected. Hence, the circuit 20 is preferably implemented as having a pole at a frequency substantially greater than 100 megahertz.

Figure 4:
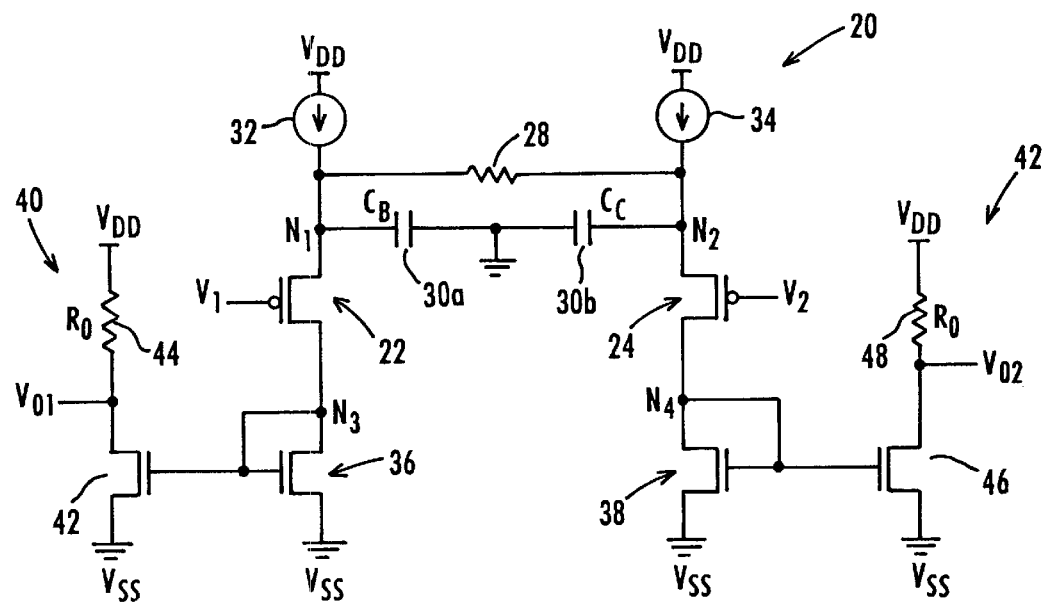
FIG. 4 is a diagram illustrating in further detail the single zero high-pass filter of FIG. 3.

FIG. 4 is a diagram illustrating in further detail the single zero high-pass filter of FIG. 3. As shown in FIG. 4, transistors 36 and 38 are used to bias a first MOS transistor circuit 40 and a second MOS transistor circuit 42, respectively. As recognized in the art, the current repeater circuit 40 includes MOS transistor 42 and resistor 44 having resistance $R_O$ for outputting the output voltage $V_{O1}$, and the current repeater circuit 42 includes a MOS transistor 46 and resistor 48 having resistance $R_O$ for outputting the voltage $V_{O2}$. Hence, the current outputs $I_1$ and $I_2$ are dropped across resistance producing devices 44 and 48, such that the final transfer function of the equalizer 20 in voltage mode becomes $H=(V_{O2}-V_{O1})/(V_2-V_1)=R_OC\ (S+1/RC_A)$.

Hence, the high-pass filter 20 can be implemented in current mode or voltage mode, where the current on the MOS transistors 36 and 38 are configured as current repeaters for repeating the differential current across subsequent transistors. The high-pass filter 20 may also be implemented in voltage mode where resistors $R_{02}$ are used to generate output voltages $V_{01}$ and $V_{02}$.

A particular advantage of the disclosed embodiment is that the capacitor 30 ($C_A$) of FIG. 3 may be implemented using two capacitors 30a and 30b having capacitances $C_B$ and $C_C$, respectively. Hence, MOS devices can be used to implement the capacitances $C_B$ and $C_C$, since each MOS device 30a and 30b has one end connected to ground, and another end connected to a corresponding node.

Another particular advantage of the disclosed embodiment is that the circuits of FIG. 3 and 4 can be implemented as CMOS devices. For example, MOS transistors 22 and 24 are PMOS transistors, and transistors 36, 38, 42 and 46 are NMOS transistors. Hence, the MOS transistors 22 and 24 provide infinite DC impedance to the network media providing the differential input signals $V_1$ and $V_2$, thus significantly reducing the signal attenuation at equalizer inputs. In addition, the high-pass filter 20 provides high speed operation due to a direct and simple conversion of the input voltages ($V_1$ and $V_2$) into operating currents ($I_1$ and $I_2$) since the MOS transistors 22 and 24 act as source followers. Hence, the equalizer bandwidth is greatly increased since there are at most two conversions, namely voltage-to-current, and current-to-output voltage. Hence, the elimination of a feedback loop optimizes the equalizer speed and eliminates any problems associated with feedback stability.

Another advantage is that the resistance values R of resistor 28 and $R_0$ of resistors 44 and 48, as well as the values of the capacitors 30, may be externally controlled. Hence, the equalizer is easily tunable by changing the size of the resistance (Gm) producing devices 28, or by adjusting the gate voltage via a control signal, described below.

Figure 5:
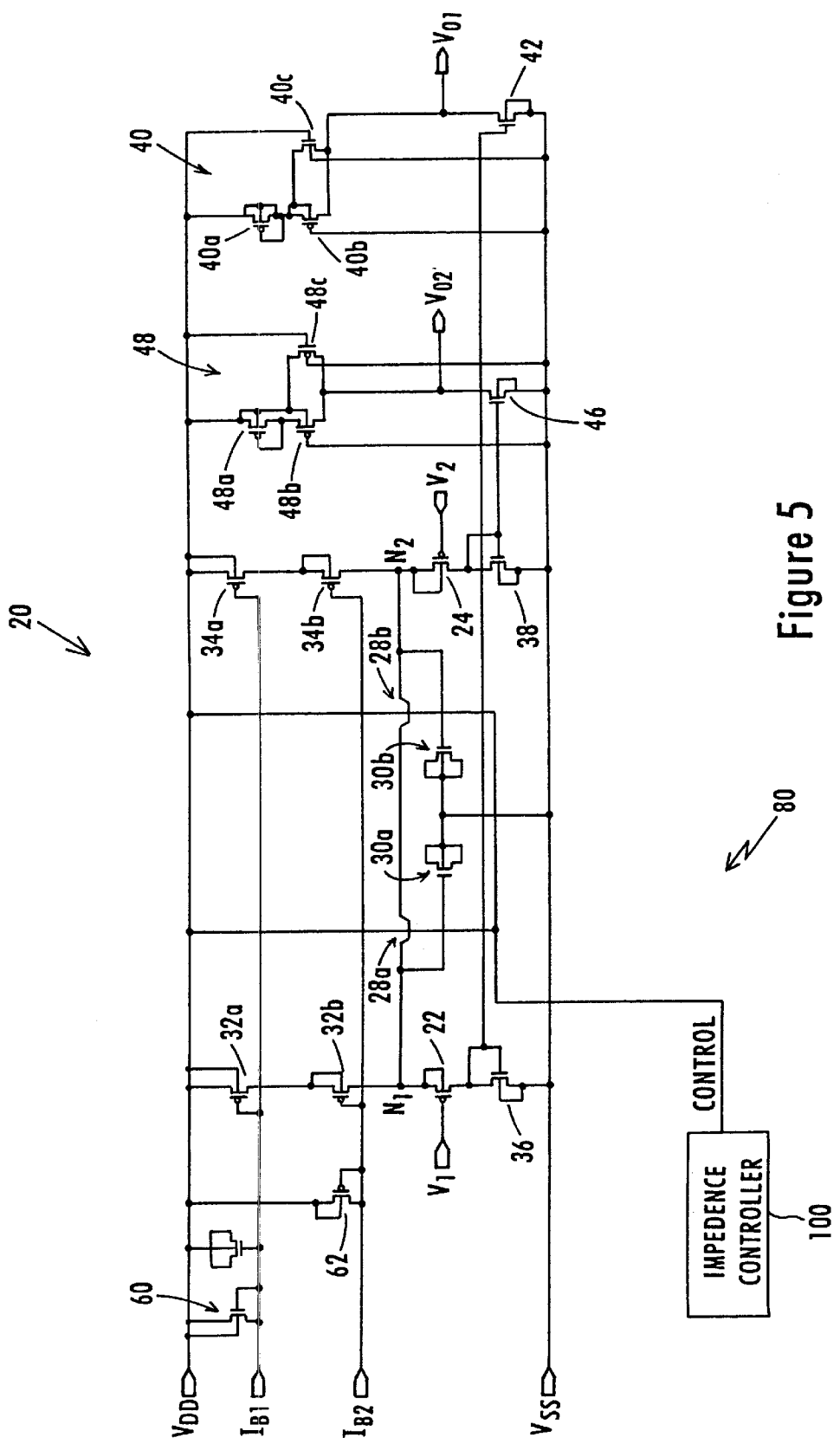
FIG. 5 is a diagram illustrating an exemplary implementation of a single zero high-pass filter of FIG. 4.

FIG. 5 is a circuit diagram illustrating an exemplary implementation of a network line equalizer 80 having the single zero high-pass filter 20 of FIG. 4 according to an embodiment of the present invention. As shown in FIG. 5, the resistor 28 is implemented as MOS transistors 28a and 28b. The resistors 28a and 28b are PMOS devices, such that one can easily change the characteristic of the high-pass filter by changing the resistor value, e.g. changing the size of the MOS device. For example, this single zero high-pass filter 20 may include a plurality of devices 28a, 28b, etc., in parallel, and may be either disabled or enabled by separate enable inputs to the corresponding gate.

Alternately, the gate voltage of the devices 28a and 28b may be changed, which changes the effective resistance. In particular, the equalizer 80 includes an impedance controller 100 for outputting a control signal (CONTROL) that selects (i.e., adjusts) the impedance of the filter 20. Hence, the control signal (CONTROL) may be implemented as a single common path to each of the resistors that has a predetermined voltage corresponding to a desired resistance, or alternately as a plurality of enable inputs supplied to respective resistance devices.

As shown in FIG. 5, bias current ($I_{B1}$ and $I_{B2}$) is supplied to transistors 32a, 32b, 34a and 34b for generating a bias current to nodes $N_1$ and $N_2$, respectively. Specifically, current flows into transistors 60 and 62, which is reflected into the MOS transistor pair 32a and 32b, and the pair of transistors 34a and 34b. The pair of transistors 32a and 32b output the bias current to node $N_1$ and transistors 34a and 34b output the bias current to node $N_2$. The MOS transistors 22 and 24 output differential currents having a difference corresponding to the impedance of MOS transistors 28 and 30, and the differential input signals $V_1$ and $V_2$.

The current mirror transistor 36 has a match, namely MOS transistor 42, that attempts to mirror the current of MOS transistor 36. Similarly, current mirror transistor 38 is matched by MOS transistor 46. Hence, the current in MOS transistor 36 will be reproduced in MOS transistor 42, and the current in MOS transistor 38 will be reproduced in MOS transistor 46. The current in MOS transistor 42 is dropped across load transistors 40a, 40b, and 40c, converting the current to the output voltage $V_{01}$. Similarly, the current in MOS transistor 46 is dropped across load transistors 48a, 48b, and 48c, producing a voltage drop that converts the current to output voltage $V_{02}$. The use of MOS transistors in implementing the resistors 40 and 48 provide a better impedance matching with subsequent CMOS-based devices receiving the output signals. In addition, the resistance values can be easily changed, either by changing the size of the MOS devices or alternately by individually controlling each of the MOS devices 40a, 40b, 40c, 48a, 48b and 48c.

Figure 6A:
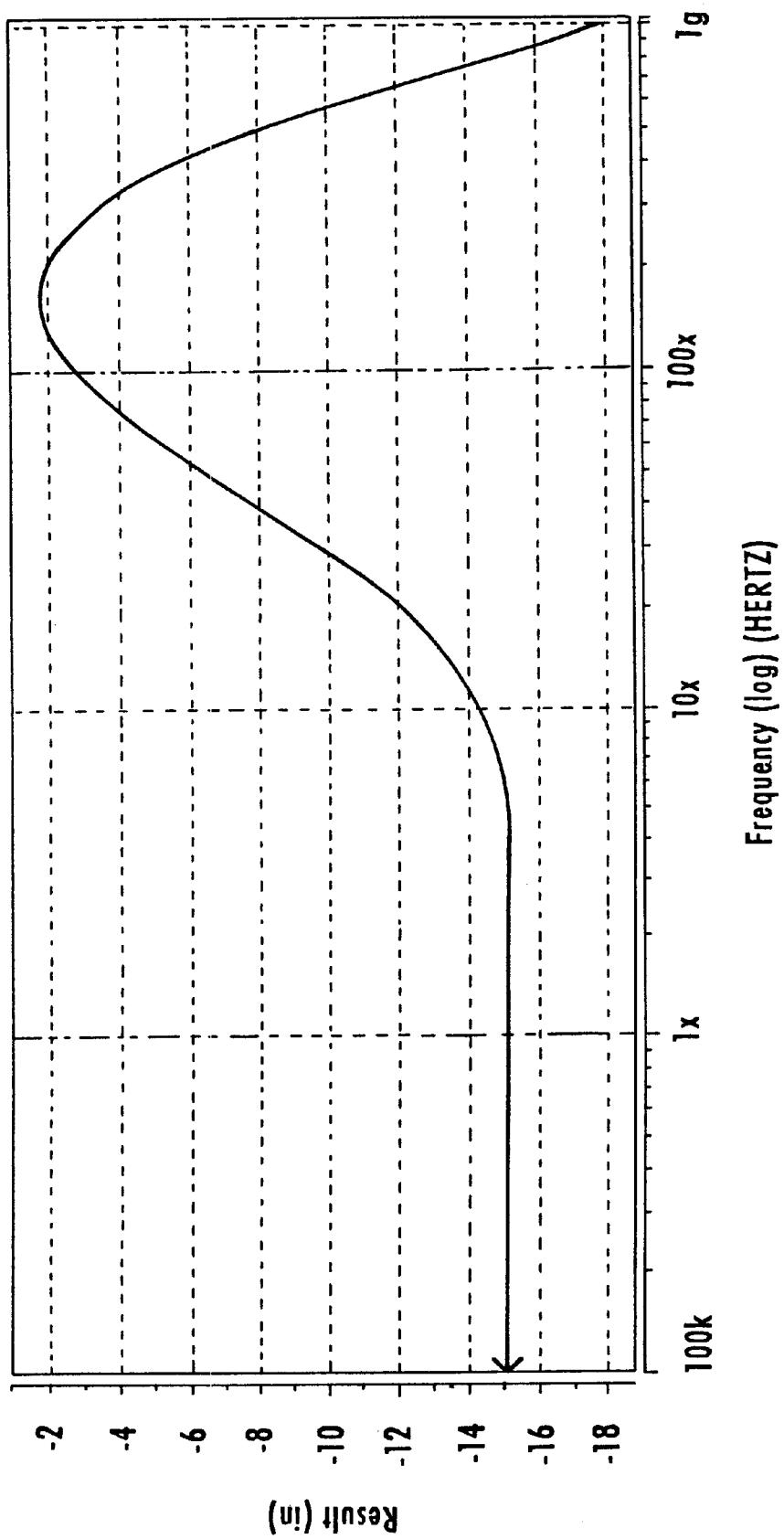
FIGS. 6A and 6B are gain and phase plots for the filter of FIG. 5, respectively.
Figure 6B:
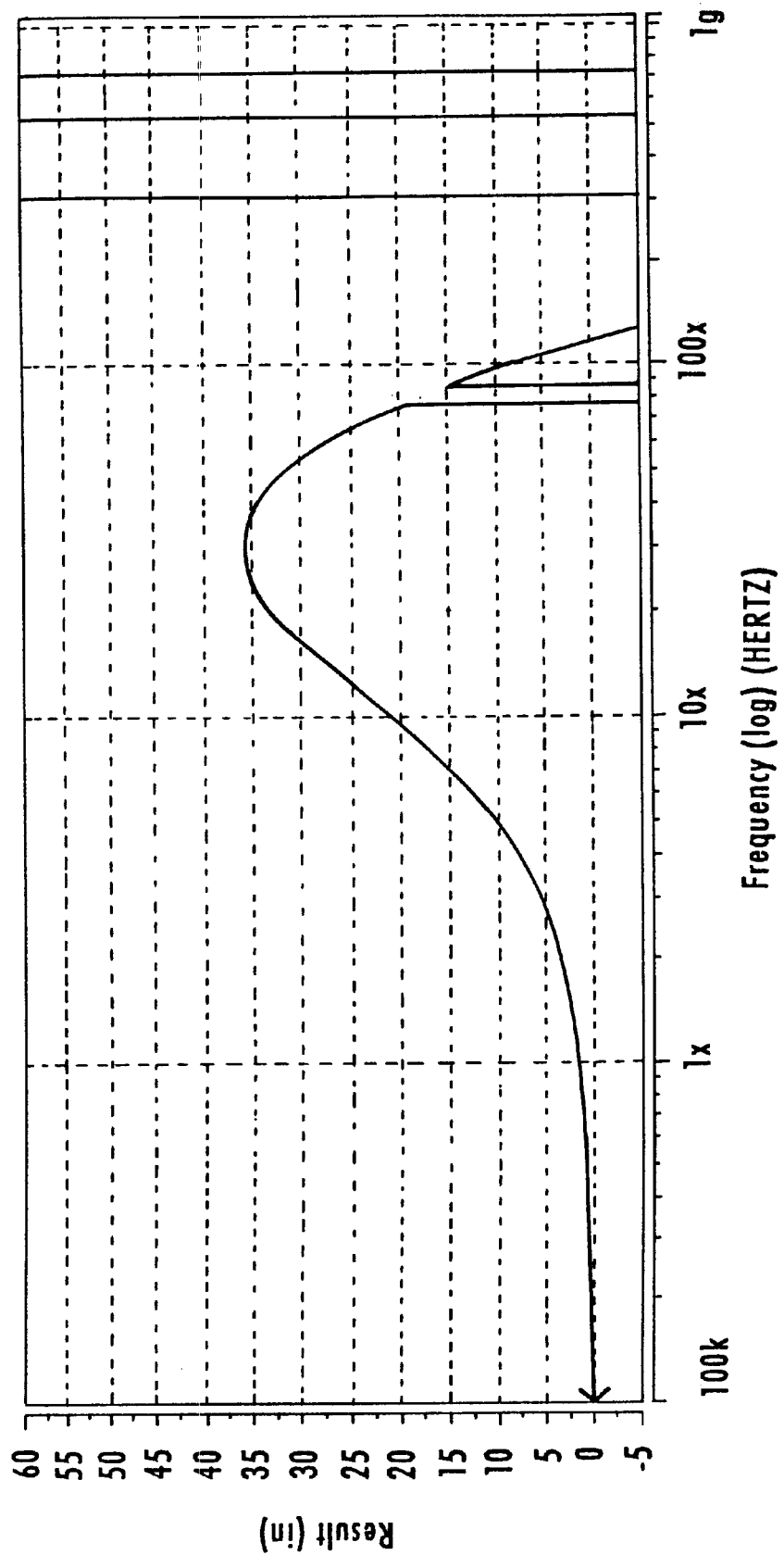

Figure 6 is a diagram illustrating a response of the high-pass filter 20 according to an embodiment of the present invention. As shown in FIG. 6A, the single zero high-pass filter 20 has a zero at about 18 MHz optimized for compensation of attenuated high-frequency components during transmission by a network medium, such as a 100-BASE-TX medium.

Although this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A single zero high pass filter comprising:

first and second metal oxide semiconductor (MOS) transistors, each having a gate for receiving a corresponding differential input signal, and first and second junctions; and a single zero impedance circuit connecting the first and second MOS transistors at the corresponding first junctions, wherein the second junctions of the first and second MOS transistors output respective differential currents having a difference corresponding to the impedance of the single zero impedance circuit and the differential input signals.

2. The single zero high pass filter of claim 1, wherein the single zero has a frequency of about 18 MHz.

3. The single zero high pass filter of claim 2, wherein the first and second MOS transistors supports/generation of a first pole at a frequency substantially greater than 100 MHz.

4. The single zero high pass filter of claim 1, further comprising:

a first current source for supplying a first bias current to a first node connecting the first junction of the first MOS transistor and a first end of the single zero impedance circuit;

a second current source supplying a second bias current to a second node connecting the first junction of the second MOS transistor and a second end of the single zero impedance circuit.

5. The single zero high pass filter of claim 4, further comprising:

a first MOS transistor circuit configured for repeating the differential current from the first MOS transistor; and a second MOS transistor circuit configured for repeating the differential current from the second MOS transistor.

6. The single zero high pass filter of claim 1, wherein the single zero impedance circuit includes MOS transistors selectively changing the impedance in response to a control signal.

7. The single zero high pass filter of claim 6, wherein the first and second MOS transistors and the MOS transistors of the single zero impedance circuit are CMOS transistors.

8. The single zero high pass filter of claim 1, wherein the single zero impedance circuit includes:
   at least one MOS transistor configured for supplying a prescribed capacitance between the first junctions of the first and second MOS transistors; and
   third and fourth MOS transistors configured for supplying a selected resistance between the first junctions.

9. The single zero high pass filter of claim 8, wherein the third and fourth MOS transistors supply the selected resistance based on respective sizes.

10. The single zero high pass filter of claim 9, wherein the third and fourth MOS transistors supply the selected resistance based on the respective sizes and in response to a control signal supplied to the gates of the third and fourth MOS transistors.

11. The single zero high pass filter of claim 8, wherein the single zero impedance circuit further includes a fifth MOS transistor configured for supplying, in combination with the one MOS transistor, the prescribed capacitance between the first junctions.

12. The single zero high pass filter of claim 8, wherein the third and fourth MOS transistors selectively supply the resistance in response to respective supplied-enable inputs.

13. A network line equalizer configured for receiving a differential pair of transmitted signals from a network medium and outputting a corrected differential pair of transmitted signals, the network line equalizer comprising:
   a single zero high pass filter comprising:
      (1) first and second metal oxide semiconductor (MOS) transistors, each having a gate for receiving the corresponding differential transmitted signal, and
      (2) a single zero impedance circuit having an impedance selectable by a control signal, the single zero impedance circuit connecting the first and second MOS transistors so that the first and second MOS transistors output the corrected differential pair of transmitted signals, a difference between values of the transmitted signals is defined by the impedance; and
   a control circuit for outputting the control signal for selecting the impedance.

14. The network line equalizer of claim 13, wherein the single zero is at a frequency of about 18 MHz.

15. The network line equalizer of claim 13, wherein the first and second MOS transistors and the MOS transistors of the single zero impedance circuit are CMOS transistors.

16. The network line equalizer of claim 13, wherein the single zero impedance circuit includes:
   at least one MOS transistor configured for supplying a prescribed capacitance between first junctions of the first and second MOS transistors; and
   third and fourth MOS transistors configured for supplying a selected resistance between the first junctions.

17. The network line equalizer of claim 16, wherein the third and fourth MOS transistors supply the selected resistance based on the respective sizes and in response to the control signal supplied to the gates of the third and fourth MOS transistors.

18. The network line equalizer of claim 16, wherein the control outputs control signals for the respective third and fourth MOS transistor, the third and fourth MOS transistors each selectively supplying corresponding resistance in response to the supply of corresponding control signal as an enable input to the corresponding gate.

19. A method of equalizing a differential pair of input signals received from a network medium, the method comprising:
   supplying the differential pair of input signals to gates of first and second metal oxide semiconductor (MOS) transistors, respectively, the first and second MOS transistors each having a first junction and a second junction;
   selecting an impedance of a single zero impedance circuit having first and second terminal ends connected to the first junctions of the first and second MOS transistors, respectively; and
   outputting a differential pair of equalized signals, generated based on the differential pair of input signals and the selected impedance, from the second junction of the first and second MOS transistors, respectively.

20. The method of claim 19, wherein the single zero impedance circuit includes MOS transistors, the selecting step including supplying a control signal to at least one of the MOS transistors of the single zero impedance circuit.

21. The method of claim 20, wherein the step of supplying a control signal includes supplying the control signal at a prescribed voltage corresponding to the selected impedance to a gate of the one MOS transistor, the one MOS transistor changing a resistance value in response to the control signal.

22. The method of claim 19, wherein the outputting step comprises supplying the differential pair of equalized signals to a current mirror circuit.

\* \* \* \* \*